(12) United States Patent
Song

(10) Patent No.: US 8,690,082 B2
(45) Date of Patent: Apr. 8, 2014

(54) LPI INJECTOR

(75) Inventor: Jinoh Song, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 243 days.

(21) Appl. No.: 13/194,438

(22) Filed: Jul. 29, 2011

(65) Prior Publication Data

US 2012/0138711 A1    Jun. 7, 2012

(30) Foreign Application Priority Data

Dec. 2, 2010    (KR) .......................... 10-2011-0122215

(51) Int. Cl.
*B05B 1/30* (2006.01)

(52) U.S. Cl.
USPC .................................... 239/533.2; 239/585.5

(58) Field of Classification Search
USPC ............... 239/533.2, 533.12, 533.13, 533.14, 239/584, 88, 89, 91–95, 585.5; 251/129.15, 251/129.21, 127
See application file for complete search history.

(56) References Cited

U.S. PATENT DOCUMENTS

| | | | |
|---|---|---|---|
| 5,263,648 A * | 11/1993 | Vogt et al. | 239/585.4 |
| 5,823,444 A | 10/1998 | Reiter et al. | |
| 6,390,067 B1 | 5/2002 | Haltiner, Jr. et al. | |
| 6,877,678 B2 * | 4/2005 | Xu et al. | 239/533.12 |
| 2004/0036048 A1 * | 2/2004 | Petersen | 251/129.15 |

FOREIGN PATENT DOCUMENTS

| | | |
|---|---|---|
| KR | 10-2001-0032506 A | 4/2001 |
| KR | 10-0931144 B1 | 12/2009 |
| KR | 10-2010-0025640 A | 3/2010 |
| KR | 10-2010-0046422 A | 5/2010 |
| KR | 10-2010-0063435 A | 6/2010 |

* cited by examiner

*Primary Examiner* — Davis Hwu
(74) *Attorney, Agent, or Firm* — Morgan, Lewis & Bockius LLP

(57) ABSTRACT

An LPI injector includes an injector body that is supplied with fuel from the upper portion and injects the fuel down, an icing tube of which the upper end is coupled to the lower portion of the injector body and that injects the fuel inside the injector body through a fuel injection channel therein, a valve seat disposed between the injector body and the icing tube and fitted in the lower portion of the injector body, having an injection hole to inject the fuel and a tube-fastening groove fitted on the icing tube around the injection hole, and a ball valve that is seated at the injector body of the valve seat and opens/closes the injection hole.

3 Claims, 3 Drawing Sheets

LPI INJECTOR

CROSS-REFERENCE TO RELATED APPLICATIONS

The present application claims priority of Korean Patent Application Number 10-2010-0122215 filed Dec. 2, 2010, the entire contents of which application is incorporated herein for all purposes by this reference.

BACKGROUND OF INVENTION

1. Field of Invention

The present invention relates to a nozzle for an LPI injector which can prevent the injection hole of an injector from being clogged with tar, by removing the gap between the lower end of the injector and the upper end of an icing tube.

2. Description of Related Art

LPI injectors are devices that inject liquid-state fuel pressurized by a fuel pump into a combustion chamber, in the fuel system of liquified petroleum gas (LPG) vehicles.

The LPI injectors are variously classified in accordance with valve operation, the type of control, and the type of injection, and particularly, are classified into a needle valve type, a pintle type including a pintle, and an orifice type including a ball valve and an orifice plate, in accordance with the shapes of nozzles. In particular, recently the orifice type having high injection efficiency is widely used.

As shown in FIG. 1, in the orifice type injector, an injector body 1 containing fuel is inserted and fixed in a housing 2. Further, a nozzle that injects the fuel at the lower portion of injector body 1 is composed of an icing tube 4 and an icing tip 3. Further, the portion connected with icing tube 4 at the lower portion of injector body 1 is composed of a ball valve 6, a valve seat 7, and an orifice plate 8.

According to orifice type LPI injector having the configuration described above, gaps B and A are defined between ball valve 6 and orifice plate 8 and between orifice plate 8 and icing tube 4, respectively.

The fuel remains in gaps A and B by evaporation of the LPG gas and the remaining fuel produces tar while repeatedly evaporating and liquefying. The tar adheres to an increasingly wide area as the time passes, such that it closes a hole 5 at the upper end of icing tube 4 which is the channel of the fuel.

That is, the tar-based foreign substances and pollutants contained in the LPG accumulate and interfere with injection of the fuel, and cause engine hesitation and have bad influence on the exhaust gas. Further, the accumulation of the foreign substances outside the injector spreads inside, such that a fuel leakage may be caused, and maintenance is difficult because ultrasonic cleansing is required to remove impurities.

As described above, the more the fuel pollutants, the more the foreign substances accumulating gaps A and B between the lower end of injector body 1 and the upper end of icing tube 4 increases and the fuel is not smoothly supplied to the combustion chamber of the engine. Accordingly, engine start becomes bad and the vehicle vibrates, and if excessive, the engine may stop in traveling.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide an LPI injector that can prevent the hole of an icing tube from being clogged with tar and prevent bad engine start, vehicle vibration, and engine stop in traveling, by having a structure that reduces or removes gaps between the lower end of the injector and the upper end of the icing tube to prevent the injection hole of the injector from being clogged by adhesion of the tar.

Various aspects of the present invention provide for an LPI injector including an injector body that is supplied with fuel from the upper portion and injects the fuel down, an icing tube of which the upper end is coupled to the lower portion of the injector body and that injects the fuel inside the injector body through a fuel injection channel therein, a valve seat disposed between the injector body and the icing tube and fitted in the lower portion of the injector body, having an injection hole to inject the fuel and a tube-fastening groove fitted on the icing tube around the injection hole, and a ball valve that is seated at the valve seat and opens/closes the injection hole.

The valve seat may be made of an elastic material.

The icing tube may have a locking protrusion on the outer circumference of the upper end and the tube-fastening groove may have a locking groove corresponding to the locking protrusion.

A plurality of the injection holes may be formed.

The LPI injector of the present invention is advantageous for the exhaust gas regulation by preventing fuel leakage due to accumulation of foreign substances, and it is possible to remove the problems, engine hesitation and bad start due to fuel leakage.

Further, it is advantageous in maintenance of a vehicle because foreign substances do not accumulate and the trouble of ultrasonic cleaning for clean the foreign substances is saved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
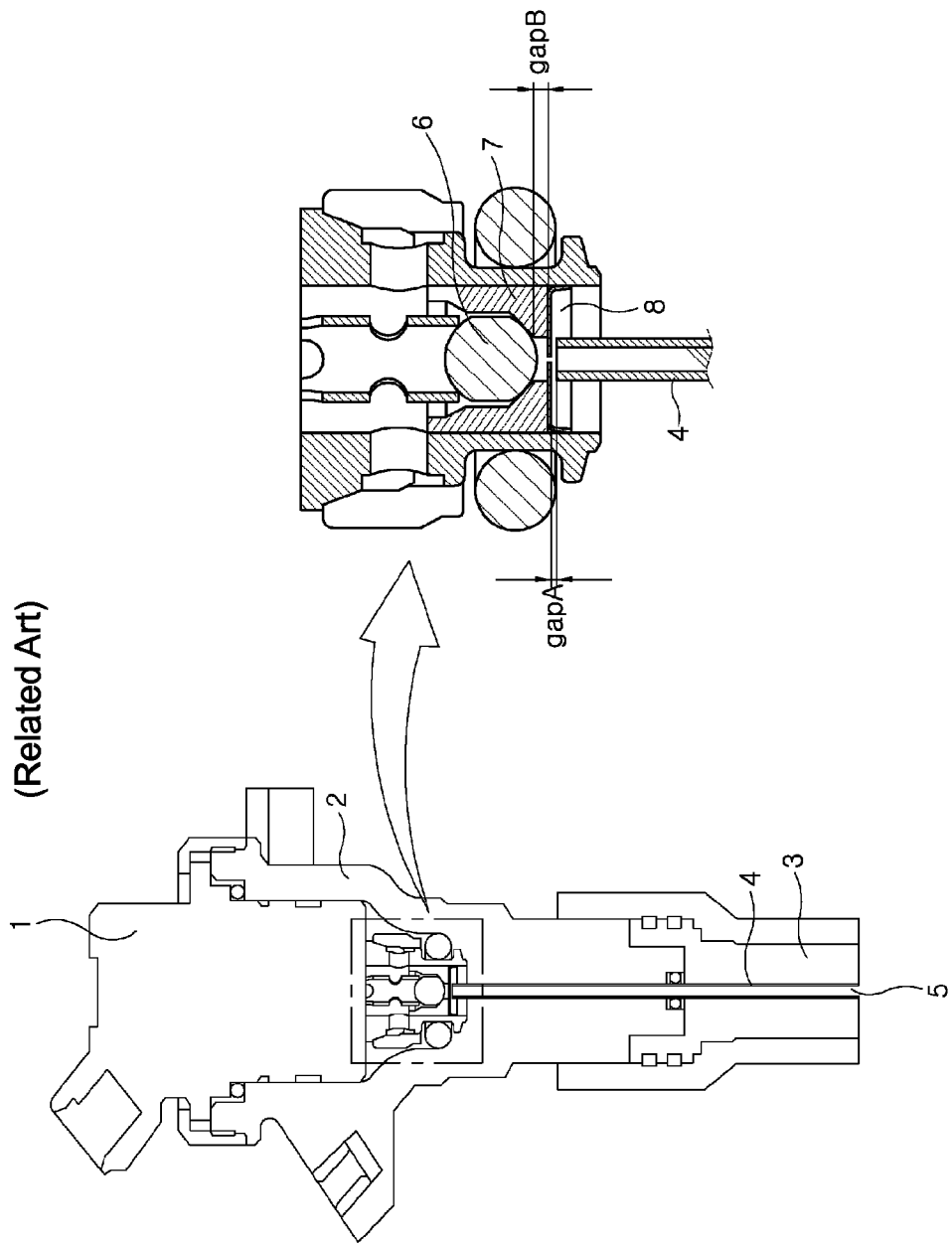
FIG. 1 is a cross-sectional view showing an LPI injector of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

When it is determined that detailed descriptions for well-known technologies may unnecessarily make the point of the present invention unclear, the detailed descriptions are not provided, in explaining the present invention. Terms described in the specification are used to discriminate one component from other components.

Various embodiments of an LPI injector can be advantageous for the exhaust gas regulation by preventing fuel leakage due to accumulation of foreign substances, and address or resolve problems, such as engine hesitation and bad start due to fuel leakage, is described with reference to the accompanying drawings.

Figure 2:
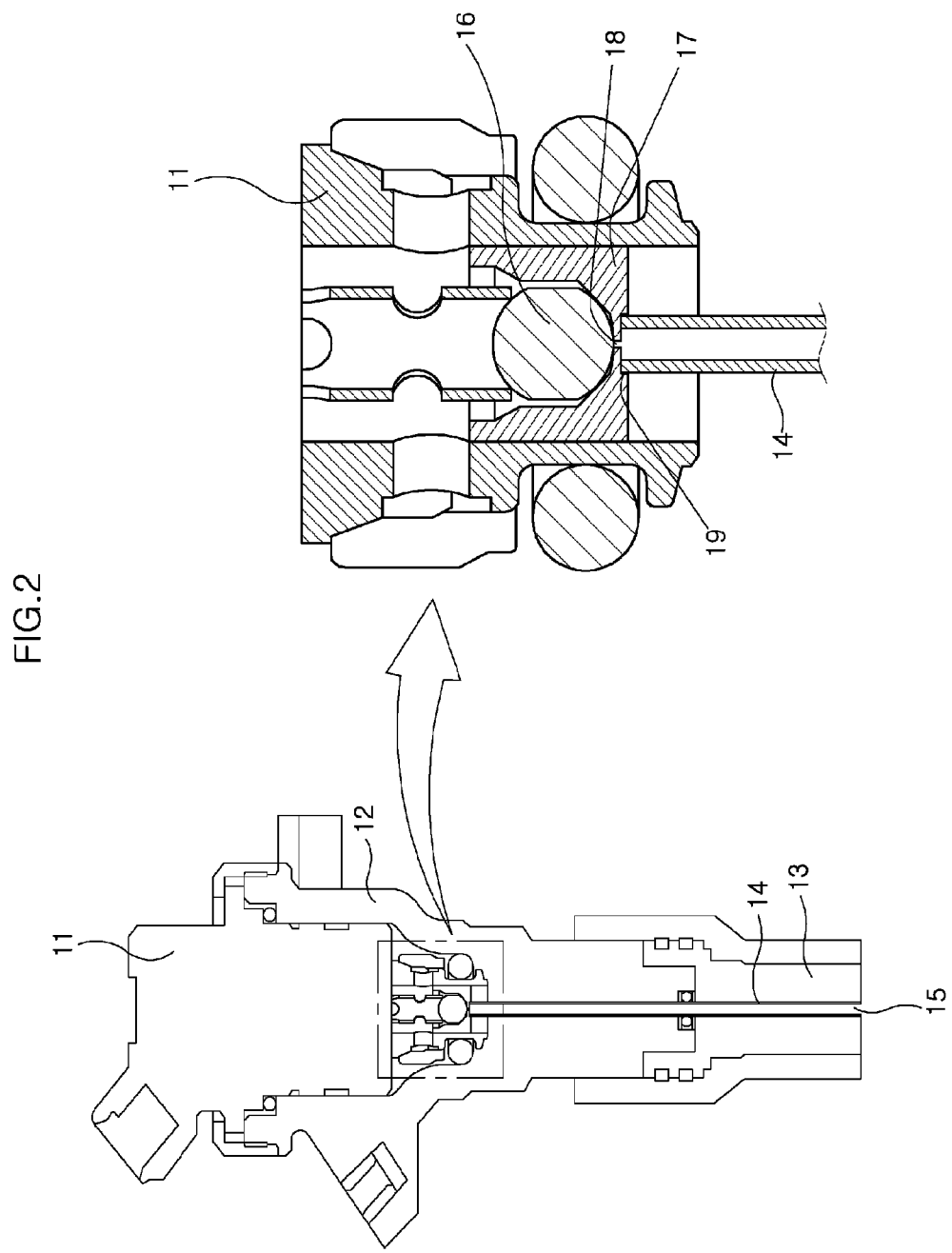
FIG. 2 is a cross-sectional view showing an exemplary LPI injector according to the present invention.

Referring to FIG. 2, an injector body 11 is inserted in a housing 12 and an icing tube 14 coupled to the lower portion of injector body 11 and injecting fuel is protected by housing 12 and an icing tip 13 coupled to the lower portion of housing 12.

Injector body 11 is a body that is supplied with fuel from the upper portion and injects the fuel into a combustion chamber through icing tube 14 coupled to the lower portion and housing 12 functions as an external cover that receives injector body 11 and icing tube 14 and protects the parts to be stably coupled.

Icing tube 14 is a member, and in some embodiments, preferably a pipe-shaped member that is made of plastic, connected to the lower end of injector body 11, and has a fuel injection channel 15 through which fuel flows, and icing tip 13 is a member, in some embodiments preferably made of brass, covering icing tube 14.

The reason of covering icing tube 14 with icing tip 13 is for preventing icing due to congelation of water where the fuel is injected, by heat transfer due to contact between icing tip 13 and an intake manifold.

The enlarged view at the right side in FIG. 2 shows in detail the structure where injector body 11 and icing tube 14 are connected.

A valve seat 17 is disposed between injector body 11 and icing tube 14 and fitted in the lower portion of injector body 11. An injection hole 18 communicating with the inside of injector body 11 is formed in valve seat 17 and the fuel that is injected from the upper portion of injector body 11 is discharged through injection hole 18.

A ball valve 16 is seated in valve seat 17 and opens/closes injection hole 18 in response to an electric signal transmitted through a connector of the injector.

A tube-fastening groove 19 is formed around injection hole 18 outside injector body 11 and fitted on the upper portion of icing tube 14. That is, since tube-fastening groove 19 is fitted on the upper portion of icing tube 14, it is a concave groove corresponding to the shape of the upper portion of icing tube 14.

That is, this structure prevents gaps A and B (FIG. 1) from being formed around the injection hole, by removing an orifice plate 8 (FIG. 1) from the structure of the existing injectors and improving the structure such that icing tube 14 is directly coupled to valve seat 17.

Figure 3:
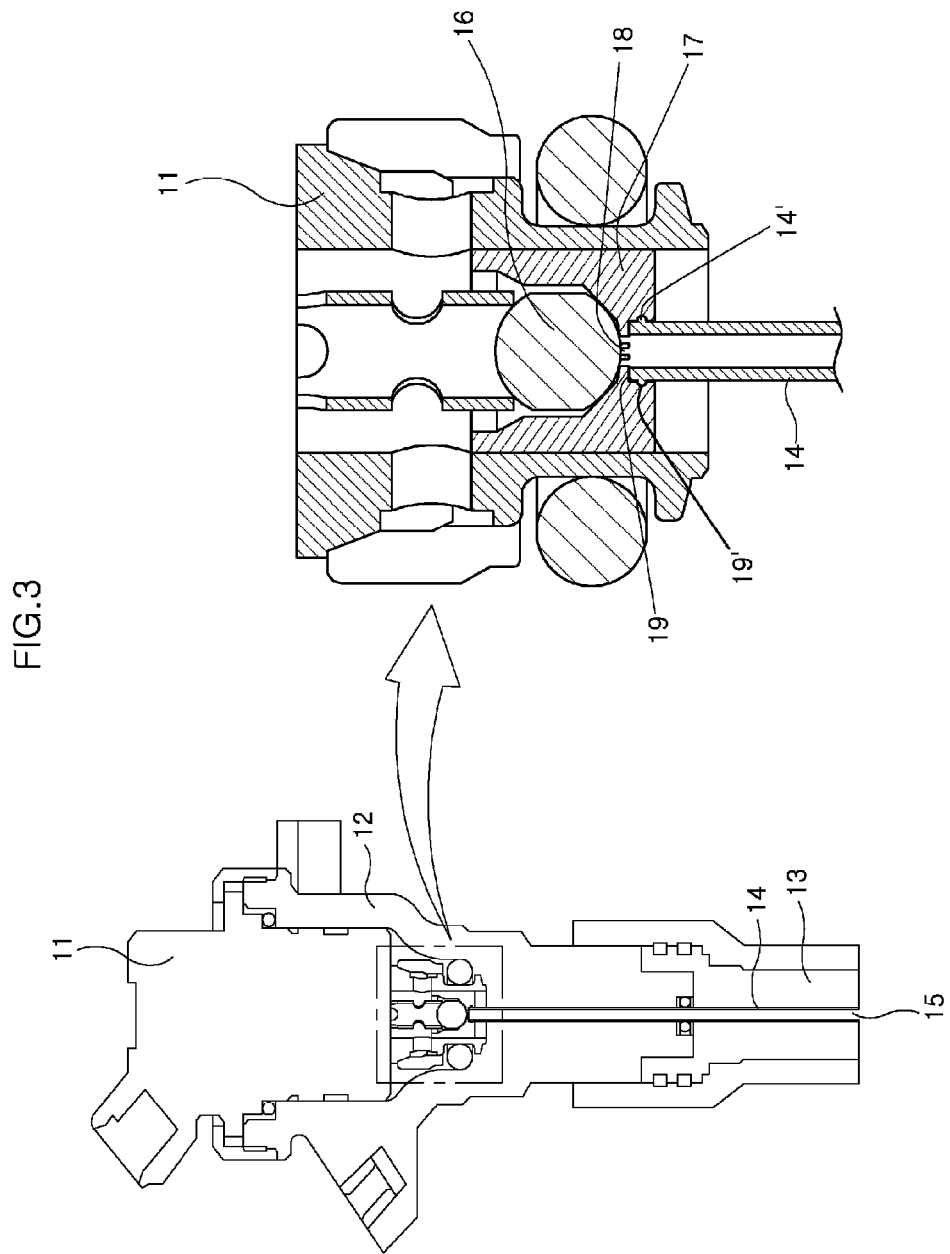
FIG. 3 is a cross-sectional view showing an exemplary LPI injector according the present invention.

As shown in FIG. 3 showing an LPI injector according to various embodiments of the present invention, a locking protrusion 14' is formed on the outer circumference of icing tube 14 such that icing tube 14 and valve seat 17 are stably fastened, and a corresponding locking groove 19' may be formed at tube-fastening groove 19.

The same as forming a plurality of injection holes in orifice plate 8 (FIG. 1), a plurality of injection holes 18 may be formed in valve seat 17 (see FIG. 3). Accordingly, atomization degree of the LPI injector (performance of atomizing liquid) is improved and fuel can be mixed well with air, such that combustion efficiency can be improved.

Further, when valve seat 17 is made of an elastic material, such as rubber, icing tube 14 and tube-fastening groove 19 can be firmly coupled, such that it is possible to prevent a gap from being formed and foreign substances, such as tar, from accumulating.

The LPI injector of the present invention is advantageous for the exhaust gas regulation by preventing fuel leakage due to accumulation of foreign substances, and it is possible to resolve the problems such as engine hesitation and bad start due to fuel leakage.

Further, it is advantageous in maintenance of a vehicle because foreign substances do not accumulate and the trouble of ultrasonic cleaning for cleaning the foreign substances is minimized.

For convenience in explanation and accurate definition in the appended claims, the terms "upper" or "lower", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An LPI injector, comprising:
    an injector body that is supplied with a fuel from an upper portion thereof and injects the fuel down;
    an icing tube formed in a pipe-shape, having a fuel injection channel through which the fuel flows, and having an upper end coupled to an lower portion of the injector body;
    a valve seat disposed between the injector body and the icing tube and fitted in the lower portion of the injector body;
    an injection hole formed at a center portion of a lower portion of the valve seat to inject the fuel; and
    a tube-fastening groove formed in the valve seat for facilitating insertion of the icing tube around the injection hole; and
    a ball valve that is seated at the valve seat and opens/closes the injection hole;
    wherein a locking protrusion is formed to radially protrude on an outer circumference of the upper end of the icing tube and a locking groove is formed at an interior surface of the valve seat around the injection hole so that the locking protrusion is engaged with the locking groove.

2. The LPI injector as defined in claim 1, wherein the valve seat is made of an elastic material.

3. The LPI injector as defined in claim 1, wherein a plurality of the injection holes is formed.

* * * * *

UNITED STATES PATENT AND TRADEMARK OFFICE
CERTIFICATE OF CORRECTION

| | | |
|---|---|---|
| PATENT NO. | : 8,690,082 B2 | Page 1 of 1 |
| APPLICATION NO. | : 13/194438 | |
| DATED | : April 8, 2014 | |
| INVENTOR(S) | : Jinoh Song | |

It is certified that error appears in the above-identified patent and that said Letters Patent is hereby corrected as shown below:

Title Page: Item (30) Foreign Priority Data should read

~~Dec. 2, 2010 (KR)................... 10-2011-0122215~~

<u>Dec. 2, 2010 (KR).................. 10-2010-0122215</u>

Signed and Sealed this
Fifteenth Day of July, 2014

Michelle K. Lee
*Deputy Director of the United States Patent and Trademark Office*